Nov. 26, 1963    J. B. KRUGER ETAL    3,111,756
ADJUSTABLE INJECTOR RAZOR
Filed Sept. 15, 1961    5 Sheets-Sheet 4
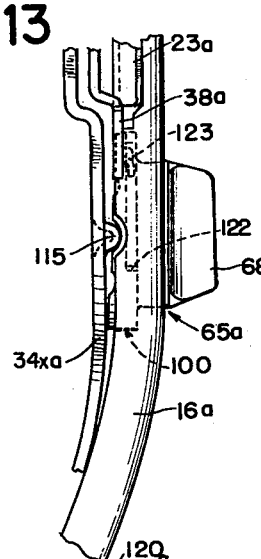
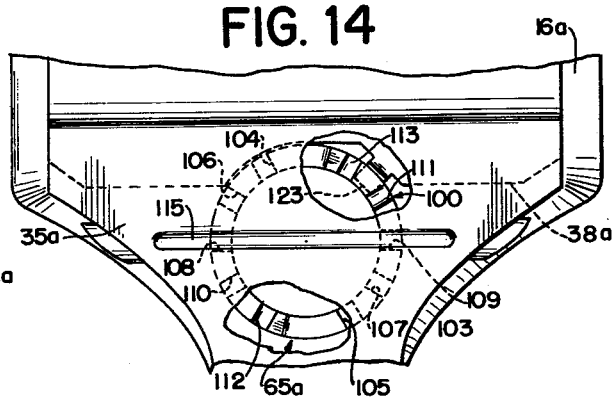
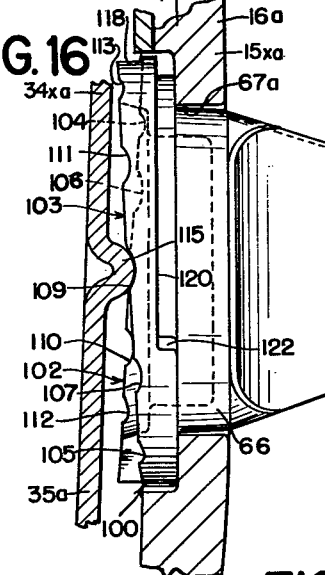
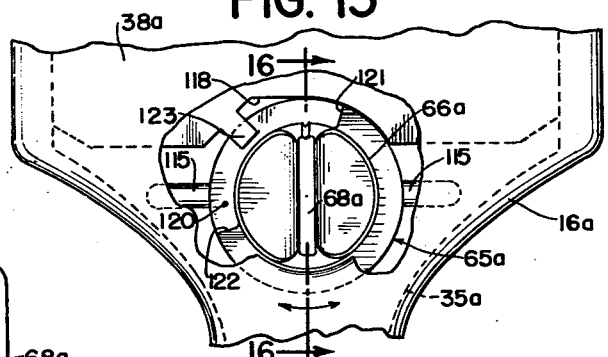
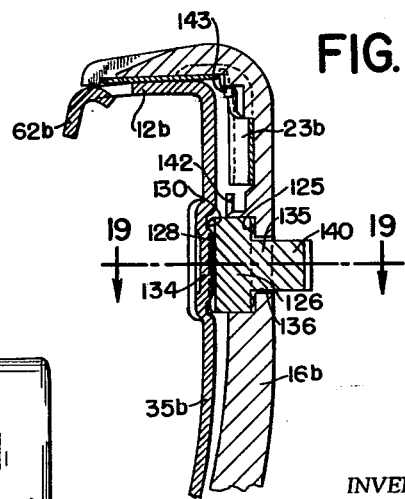
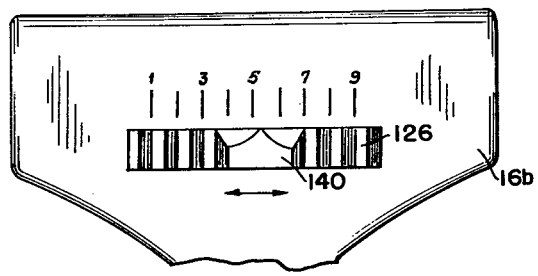
INVENTORS
JAMES B. KRUGER
ROBERT L. BORDEAU
BY Robert Irving Williams
ATTORNEY

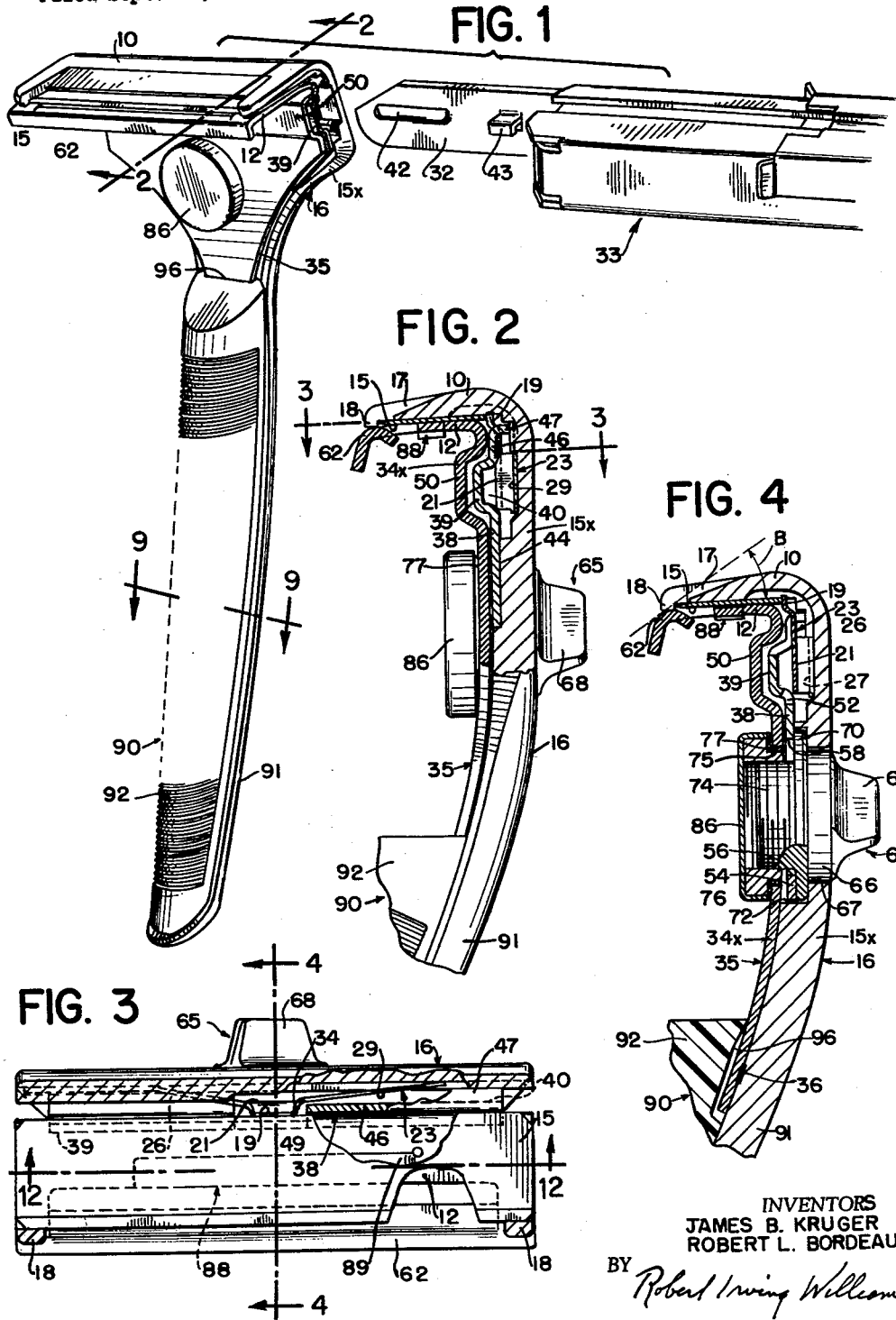

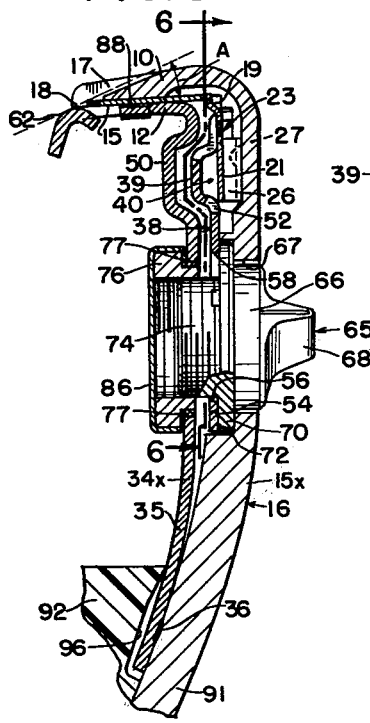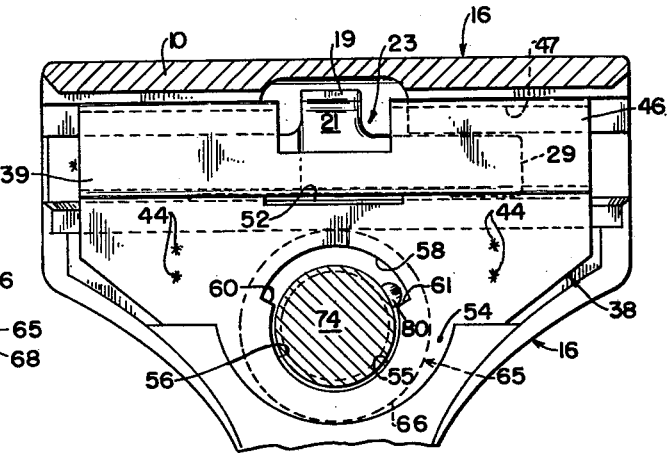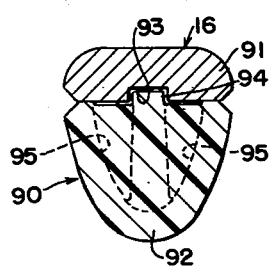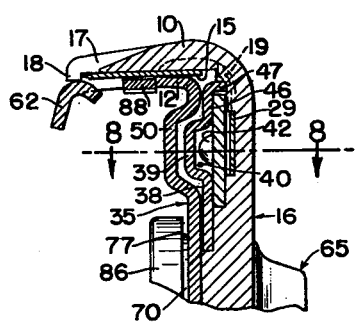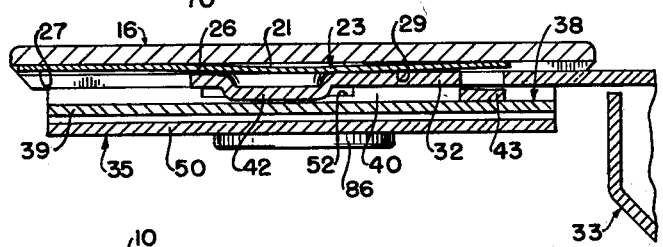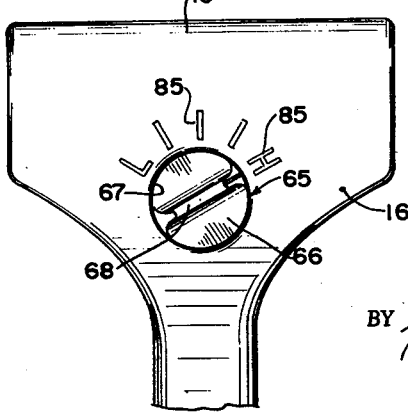

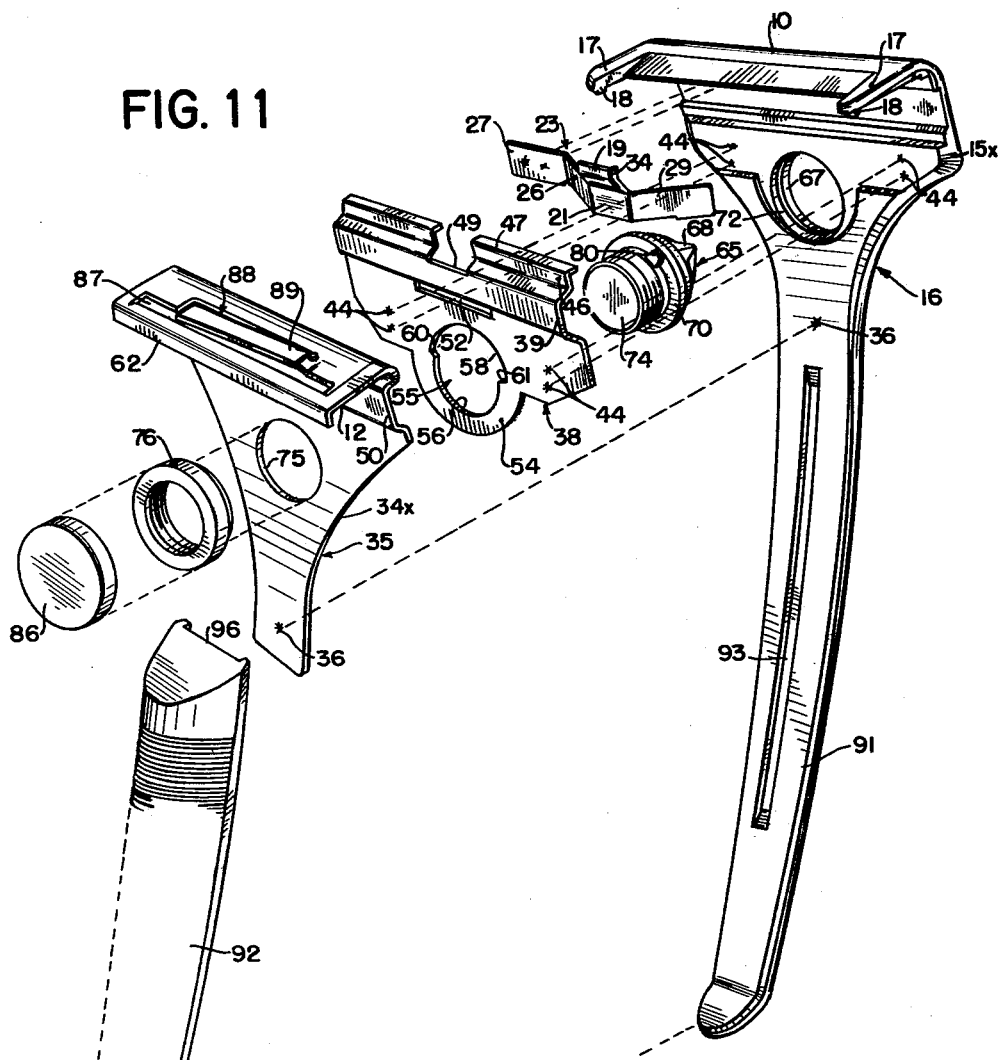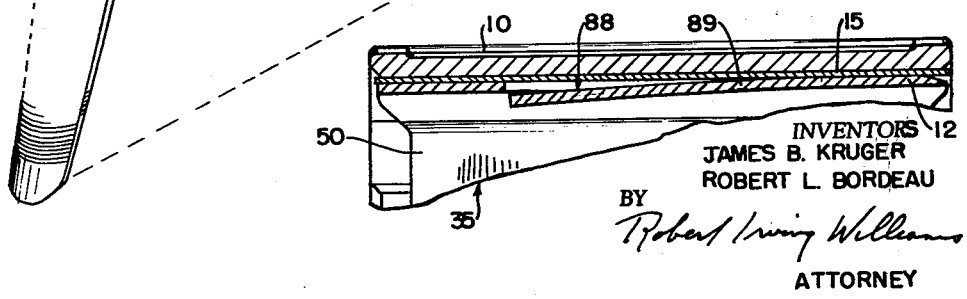

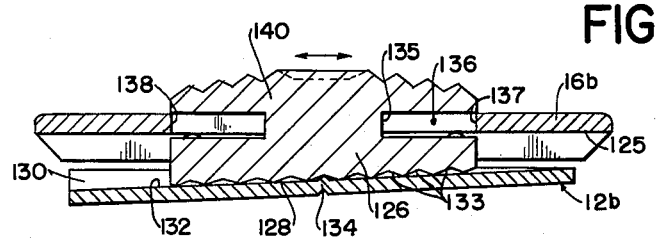

United States Patent Office 3,111,756
Patented Nov. 26, 1963

3,111,756
ADJUSTABLE INJECTOR RAZOR
James B. Kruger and Robert L. Bordeau, Staunton, Va., assignors to Philip Morris Incorporated, New York, N.Y., a corporation of Virginia
Filed Sept. 15, 1961, Ser. No. 138,485
13 Claims. (Cl. 30—63)

This invention relates to safety razors, and particularly those wherein a new blade is fed longitudinally into the head of the razor from an injector magazine; and has for its primary object the provision of a simple and highly effective razor construction which embodies means for adjusting the shaving angle of the blade.

Among the other objects of the invention in various of its aspects are the provision of an injector razor wherein the elements cooperate with particular certainty and effectiveness, under various conditions of operation, wherein one of certain improved types of adjusting means is provided, wherein a blade may be inserted and held in position with ease, certainty, and effectiveness regardless of the position of adjustment, and wherein there is provided a razor which will effectively perform the purpose for which it is intended.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which:

FIGURE 1 is a perspective view of one form of razor embodying the invention and shown in association with an injector magazine;

FIG. 2 is a partial sectional view on the line 2—2 of FIG. 1;

FIG. 3 is a sectional view on the line 3—3 of FIG. 2;

FIG. 4 is a partial sectional view on the line 4—4 of FIG. 3 and showing the razor in one extremity of its adjustment;

FIG. 5 is a similar view showing the razor in the other extremity of its adjustment;

FIG. 6 is a sectional view on the line 6—6 of FIG. 5;

FIG. 7 is a sectional view similar to the upper portion of FIG. 2 and showing the razor with the injector key inserted;

FIG. 8 is a sectional view on the line 8—8 of FIG. 7;

FIG. 9 is a sectional view on the line 9—9 of FIG. 1;

FIG. 10 is a rear view of the upper portion of the razor showing the adjustment corresponding to that of FIGS. 1–4;

FIG. 11 is an exploded view showing the parts of the razor of FIGS. 1–10;

FIG. 12 is a sectional view on the line 12—12 of FIG. 3;

FIG. 13 is a fragmentary side view illustrating, in a position of intermediate adjustment, a modification of the razor shown in FIGS. 1–12;

FIG. 14 is a front view thereof;

FIG. 15 is a rear view thereof;

FIG. 16 is a sectional view on an enlarged scale on the line 16—16 of FIG. 15;

FIG. 17 is a sectional view of the upper portion of a razor showing, in a position of intermediate adjustment, another modification of the razor shown in FIGS. 1–12;

FIG. 18 is a rear view thereof;

FIG. 19 is a sectional view on an enlarged scale on the line 19—19 of FIG. 17;

FIG. 20 is a side view of the upper portion of a razor showing, in an adjustment corresponding to that of FIGS. 1–4, still another modification of the razor shown in FIGS. 1–12;

FIG. 21 is a front view thereof partly broken away; and

FIG. 22 is a side view on an enlarged scale with certain parts broken away and others in section, and showing an intermediate position of adjustment.

The form of razor particularly exemplified in FIGS. 1–12 comprises a cap 10 and an underlying blade clamp 12 adapted to receive a (rigid single-edge) injector blade 15 therebetween, the blade clamp 12 serving, in the present instance, to assure that the blade is held against the underside of the cap. The cap is carried on a supporting arm 15x and both are part of a stainless steel frame member 16, and the cap is formed at its forward ends with forwardly-extending members 17 carrying blade stops 18. The rear (dull) edge of the blade is normally engaged by, and the blade thrust against the blade stops by, a tab 19 extending upwardly and forwardly from the central forward portion 21 of a laterally extending forwardly-bowed portion of a blade-spring 23, one arm 26 of which is mounted on an extension 27 which is secured in place against, as by being welded to, the frame member 16 toward one side of the razor; and the other arm 29 is adapted to be contacted by the key 32 of an injector magazine entering from the other side of the razor, a standard form of which key is shown at 33, engaging the forwardly-sloping arm 29 and flattening the bowed portion of the blade-spring to move the tab 19 rearwardly when a new blade is to be injected. The tab 19 is provided with a rolled-over surface 34 to assure that the injector key 32 will slide past it.

The blade clamp 12 is carried on an arm 34x and both are part of a rearwardly-urged resilient stainless steel member 35 the lower end of which is welded to the frame member 16 at 36, and behind the member 35 there is fitted a key-retaining member 38 which is spaced sufficiently forwardly of the arm 15x to admit the key 32 of the magazine 33, and which is formed to guide the key along a path in which it will contact the sloping arm 29 and flatten the spring 23. The term "flattening" is used herein to include a partial as well as a complete flattening; but the flattening should be, and as exemplified is, sufficient to leave ample room behind the blade stops for a new blade to be moved into the razor without its cutting edge contacting the blade stops. The member 38 is bent out forwardly at 39 at its right-hand end portion (FIG. 3) to provide a channel 40 for the receiving of the usual bump 42 and protuberance 43 on the key. The lower end portions of the member 38 are welded at 44 to the frame member 16. At said right-hand end portion the member 38 extends upwardly at 46 and then rearwardly at 47 to contact the member 16. At its central portion, the entire upper portion of the member 38 is cut away at 49 (below the top of the channel 40, in the present instance), to admit the tab 19. The member 35 is provided with a forwardly-bent-out portion 50 to accommodate the portion 39. It is to be observed that the member 38 has sufficient firmness so that the insertion of a key such as 32 will not move it but will serve merely to flatten out the bowed portion of the blade-spring 23, thus moving the tab 19 rearwardly so as to be out of the way of an incoming blade and so as to release a used blade for movement out of the razor ahead of the incoming blade. During its movement into the razor the cutting edge of the new blade will, as above indicated, be sufficiently rearward of the blade stops 18 so that it will not be dulled by coming into contact with them. When the key 32 is withdrawn, however, the tab 19 will press the new blade forwardly so that the ends of its cutting edge will contact the blade-stops.

The member 38 is cut away at 52 in line with the portion 21 of the blade spring. At its lower end, the member 38 carries a depending tab 54 formed with an opening 55, the lower portion of which is defined by a longer arc 56 of smaller radius and the upper portion of which is defined by a shorter arc 58 of larger radius whereby stop shoulders 60 and 61 are provided, all for a purpose to be hereinafter described.

The blade clamp 12, as exemplified, carries a guard 62, and the construction above described lends itself particularly well to the adjustment of the shaving angle between the guard 62 and the cutting edge of a blade 15 by a rearward and forward movement of the blade seat, and there is exemplified a particular and highly effective means for effecting such movement. To this end, there is provided a screw-type adjusting button 65 having a head 66 rotatably mounted in a circular opening 67 in the frame 16 and formed with a gripping rib 68. Forwardly of the head is an enlarged disk 70 mounted in an enlarged opening 72 in the frame 16, and from this a smaller-diameter threaded stem 74 extends forwardly thru the opening 55 in the member 38 and an opening 75 in the member 35. The opening 75 is larger than the stem 74 and contains a nut 76 which is secured to the member 35 at 77, as by soldering, and which is formed with a threaded bore in which the stem 74 is screwed. The disk 70 carries a a forward projection 80 which is movable in the upper portion of the opening 55 between the stops 60 and 61 to limit the movement of the screw 65. It is to be noted that the member 38 possesses a resilient bias (though less than that of the spring 23) sufficient to yield between the indexing movements, and that there is a space between the tab 54 and the member 35. Indicia 85 are applied to the rear surface of the frame 16 to indicate varying positions of the gripping rib 68. A dish-shaped cover 86 is fitted over the nut 76. By means of the screw 65 the seat 12 may be moved between the position of FIG. 5 wherein there is provided a shaving angle A (of 25° in the present instance) and the position of FIG. 4 wherein there is provided a shaving angle B (of 35° in the present instance).

The blade clamp 12 is provided with the usual longitudinal opening 87 and is formed rearwardly thereof with a cut-out spring 88 bowed upwardly at 89 and secured thereto at its right-hand end (FIGS. 11 and 12) and with its free end at the left, and serving to assure that the blade is effectively clamped between the blade clamp 12 and the underside of the cap 10.

The razor is provided with a handle 90 the rear and bottom portions of which are provided by the lower part 91 of the frame 16 and the forward portion of which is provided by a grip member 92 formed of plastic and having a roughened surface. The forward surface of the part 91 is formed with longitudinal groove 93 into which there is fitted a rib 94 on the grip member, and the grip member is cemented securely to the part 91. The grip member is cut away at 95, and is provided at the rear of its upper end with a recess 96 to receive the lower end of the member 35.

In the form of construction exemplified in FIGS. 13–16, the parts are similar, except as shown or described, to those of the construction exemplified in FIGS. 1–12, and the parts are designated by similar reference numerals distinguished by the subscript $a$. In this form of construction, there is provided a cam-type adjusting button 65$a$ having a head 66$a$ rotatably mounted in a circular opening 67$a$ in the arm 15$xa$ of frame 16$a$ for operation by a gripping rig 68$a$. Disposed forwardly of the head is an annulus 100 having a peripheral portion larger than the opening 67$a$ to prevent rearward movement of the button. This annulus is formed on its forward face with two oppositely-disposed arcuate cam surfaces 102 and 103 symmetrically spaced with respect to the rib 68$a$ and sloping in opposite directions with respect to the vertical (FIG. 16) but in the same direction with respect to the rotation of the button. The arcuate cam surfaces are formed with five diametrically-alined pairs of grooves 104—105, 106—107, 108—109, 110—111, and 112—113, in any alined pair of which a rearward bend 115 in the blade-clamp carrying arm 34$xa$ is adapted to seat, movement between seating positions being permitted by the flexing of the arm 34$xa$. In order to admit the annulus 100, the key-retaining member 38$a$ is cut away at 118; and, in order to limit the rotation of the button, the annulus 100 is formed with an arcuate recess 120 terminating in shoulders 121 and 122 which are adapted to contact a lug 123 which extends from the member 38$a$ into the recess 120 to limit the rotary movement of the button 65$a$ to less than a single rotation. Thus, when the rotation of the button brings the grooves 104—105 in line with the bend 115, the blade clamp will be in the position of FIG. 4 to provide a maximum shaving angle; when the grooves 112—113 are brought in line with the bend 115, the blade clamp will be in the position of FIG. 5 to give a minimum shaving angle; and when an intermediate pair of grooves are brought in line with various intermediate pairs of grooves, various intermediate shaving angles will be obtained.

In the form of construction exemplified in FIGS. 17–19, the parts are similar, except as shown or described, to those of the construction exemplified in FIGS. 1–12, and the parts are designated by similar reference numerals distinguished by the subscript $b$. In this form of construction, there is provided a cam-slide for adjusting the position of the blade clamp 12$b$ and of the guard 62$b$ carried therebetween. The frame 16$b$ is formed with a lateral recess 125 in which there is fitted a slider 126 having a forward cam surface 128 sloping rearwardly toward the key-receiving edge of the razor. The clamp-carrying arm 35$b$ is bent out forwardly to form a laterally-extending trough 130 with a rearward cam surface sloping similarly to the surface 128. Accordingly, as the slider 126 is slid toward the right (FIG. 19), the arm 35$b$, (and the guard with it) will be slid forwardly, and as the slider 126 is slid toward the left, the resiliency of the arm 35$b$ will be permitted to move it (and the guard with it) in a rearward direction. The surface 128 is formed with a plurality of transverse grooves 133 mating with a transverse ridge 134 on the surface 132 to hold the slider in an adjusted position until intentionally moved therefrom. The slider is formed with a neck 135 which extends through a slot 136 of greater extent than the neck laterally of the razor and terminating in shoulders 137 and 138 to limit the movement of the slider, and which carries an operating head 140 on its rearward end. In this construction, the means for guiding the key of the injector magazine is in the form of an upwardly-extending flange 142 integral with the frame 16$b$ and serving the purpose of the lower portion of the member 38, and a downwardly-extending flange 143 integral with the frame 16$b$ and serving the purpose of the upper portion of the member 38, so that an injector key inserted behind these flanges will flatten the spring 23$b$. The bend 50 is omitted from the arm 35$b$.

In the form of construction exemplified in FIGS. 20–22, the parts are similar, except as shown and described, to those of the construction exemplified in FIGS. 1–12, and the parts are designated by similar reference numerals distinguished by the subscript $c$. In this form of construction, the spring 23$c$ is flattened by an injector key guided by flanges 142$c$ and 143$c$ integral with the frame 16$c$ as in FIGS. 16–18; and the adjustment of the arm 35$c$ (and the clamp 12$c$ and the guard 62$c$ therewith) is affected by a wheel-and-cam arrangement. The bend 50 is omitted from the arm 35$c$. The frame 16$c$ and the arm 35$c$ are formed respectively with central openings 145 and 146 to receive an operating wheel 148 having V-grooves 149 in its surface and is fixed on a shaft 150 seated at 151 and 152 respectively in semi-cylindrical bearings in the frame 16$c$, and held seated therein by the resiliency of arm 35$c$, and carrying on its ends cam segments having outward cam surfaces 154 and 155 adapted to bear on a rearward surface 156 of the arm 35c to cam the latter forwardly as shown in FIG. 22. The frame 16c is cut out at 159 and 160 to provide recesses for the reception of the cam segments and stops 161 and 162 limiting the movement thereof. In order to normally hold the wheel 148 in an adjusted position there is provided a spring 165 disposed in a recess 166 and formed with a bend 167 adapted to spring into whatever V-groove is alined therewith. One end of the spring 165 is divided to provide end portions 168 and 169 which are welded to the frame 16c, and the other end 170 thereof is bent rearwardly to lie and bear against the bottom wall of the recess 166.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Certain subject matter disclosed but not specifically claimed herein is claimed in my co-pending divisional application Serial No. 305,136, filed August 28, 1963.

We claim:

1. An injector razor comprising a cap having blade stops thereon, an arm extending downwardly from the cap, a blade clamp beneath said cap, a guard fixed to the blade clamp, a rearwardly-urged forwardly-movable arm extending downwardly from the blade clamp forwardly of the first-mentioned arm, means to move the second-mentioned arm forwardly to adjust the position of the second-mentioned arm with respect to the first-mentioned arm to adjust the relative position of said guard and said blade stops to vary the cutting angle of a blade in the razor, a spring adapted normally to press a blade against said blade stops, and a key-retaining member disposed between said arms and attached to and carried by the first-mentioned arm and positioned to guide the key of an injector magazine between itself and the first-mentioned arm, said spring having a portion extending between said key-retaining member and said first-mentioned arm for deflection of said spring by a key so guided.

2. A razor as in claim 1 wherein said adjusting means is in the form of screw-and-nut means carried respectively by said arms.

3. An injector razor comprising a cap having blade stops thereon, an arm extending downwardly from the cap, a blade clamp beneath said cap, a guard fixed to the blade clamp, a rearwardly-urged forwardly-movable arm extending downwardly from the blade clamp forwardly of the first-mentioned arm, means adjustably carried by the first-mentioned arm to move the second-mentioned arm forwardly for adjusting the position of the second-mentioned arm with respect to the first-mentioned arm to adjust the relative positions of said guard and said blade stops to vary the cutting angle of a blade in the razor and formed with a forward cam surface cooperative means on the second-mentioned arm bearing rearwardly against said cam surface, a spring adapted normally to press a blade against said blade stops, and a key-retaining member disposed between said arms and attached to and carried by the first-mentioned arm and positioned to guide the key of an injector magazine between itself and the first-mentioned arm, said spring having a portion extending between said key-retaining member and said first-mentioned arm for deflection of said spring by a key so guided.

4. A razor as in claim 3 wherein said adjusting means is in the form of a rotary button carried by the first-mentioned arm and formed with said forward cam surface, and wherein means are provided to limit the rotary movement of the button to less than a single rotation.

5. A razor as in claim 4 wherein said button is formed with an additional forward cam surface, wherein said arm surfaces are symmetrically arranged, and wherein each of said cam surfaces slopes in the same direction as the other with respect to the rotation of the button.

6. A razor as in claim 3 wherein said adjusting means is in the form of a slidable member carried by the first-mentioned arm and formed with a forward cam surface.

7. A razor as in claim 3 wherein said cam surface is interrupted by rearward recesses at spaced points therealong and said cooperating means is adapted to engage said recesses to provide for a step-by-step operation of said adjusting means.

8. A razor as in claim 1 wherein there is provided an upwardly-bearing spring carried by said blade clamp for bearing against the underside of a blade lying between said blade clamp and said cap.

9. An injector razor comprising a rearward arm, a cap carried thereby, blade stops on said cap, a forward rearwardly-urged arm secured at a lower portion to the first-mentioned arm, a blade clamp formed to provide an integral guard and carried by an upper portion of the second-mentioned arm, a key-retaining member secured to the first-mentioned arm and lying between it and the second-mentioned arm and providing with the first-mentioned arm a guide means for the insertion therebetween from one side of the razor of the key of an injector magazine, a blade-spring secured to said first-mentioned arm at an area laterally remote from said side and having a free portion extending toward said side from said area first forwardly and then rearwardly across the path of a key inserted from said side of the razor for deflection thereby and a part extending upwardly from a forward part of the aforesaid portion and adapted normally to press a blade against said stops, and means for moving the second-mentioned arm to adjust the position of said clamp and said guard for varying the cutting angle of a blade pressed against said stops by said blade-spring.

10. A razor as in claim 9 wherein said adjusting means comprises a rotatable adjusting button at the rear of the first-mentioned arm and having a portion passing therethru, and means adjustably associated with said second-mentioned arm for varying the position thereof.

11. A razor as in claim 10 wherein said button is formed with a rearward diametrical handle.

12. A razor as in claim 9 wherein said button carries a portion extending thru the first-mentioned arm and having a threaded end, and wherein a nut fixed to said second-mentioned arm receives said threaded end.

13. A razor as in claim 9 wherein said button carries a portion extending thru the first-mentioned arm and having a forward surface-portion bearing on a rearward surface portion of said second-mentioned arm, and wherein one of said surface portions is a cam surface.

References Cited in the file of this patent

UNITED STATES PATENTS

| | | |
|---|---|---|
| 2,058,633 | Rodrigues | Oct. 27, 1936 |
| 2,060,243 | Rodrigues et al. | Nov. 10, 1936 |
| 2,362,765 | Mills | Nov. 14, 1944 |
| 2,661,533 | Shnitzler | Dec. 8, 1953 |
| 2,799,926 | Shaylor | July 23, 1957 |